United States Patent
Lickfold et al.

(10) Patent No.: US 9,308,933 B2
(45) Date of Patent: Apr. 12, 2016

(54) OSCILLATORY FEEDBACK THROUGH VEHICLE STEERING

(71) Applicant: Jaguar Land Rover Limited

(72) Inventors: David Lickfold, Leamington Spa (GB); Anthony Whittle, Nuneaton (GB); Nick Temple, Coventry (GB); John Kewley, Leamington Spa (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/291,934

(22) Filed: May 30, 2014

(65) Prior Publication Data

US 2015/0344069 A1 Dec. 3, 2015

(51) Int. Cl.
*B62D 5/00* (2006.01)
*B62D 5/04* (2006.01)
*B62D 6/00* (2006.01)

(52) U.S. Cl.
CPC .............. *B62D 5/046* (2013.01); *B62D 5/0409* (2013.01); *B62D 6/008* (2013.01)

(58) Field of Classification Search
CPC .... B62D 15/025; B62D 5/0409; B60W 50/16
See application file for complete search history.

(56) References Cited

U.S. PATENT DOCUMENTS

| 6,220,385 | B1* | 4/2001 | Bohner et al. | 180/403 |
| 6,370,459 | B1* | 4/2002 | Phillips | 701/41 |
| 8,423,246 | B2* | 4/2013 | Takeda et al. | 701/41 |
| 2006/0052201 | A1* | 3/2006 | Augustine et al. | 475/19 |
| 2007/0227804 | A1* | 10/2007 | Fukuda et al. | 180/444 |
| 2007/0288143 | A1* | 12/2007 | Arima et al. | 701/41 |
| 2008/0243340 | A1* | 10/2008 | Hung et al. | 701/42 |
| 2008/0296084 | A1* | 12/2008 | Bohm et al. | 180/441 |
| 2009/0024279 | A1* | 1/2009 | Takeda et al. | 701/41 |
| 2009/0292421 | A1* | 11/2009 | Williams et al. | 701/42 |

* cited by examiner

*Primary Examiner* — Van Trieu
(74) *Attorney, Agent, or Firm* — Reising Ethington P.C.

(57) ABSTRACT

There is disclosed a steering system for a vehicle. The system comprises a rotatable steering column co-operable with a steering wheel. A steering member is co-operable with the steering column such that rotary motion of the steering column causes linear motion of the steering member and linear motion of the steering member causes rotary motion of the steering column. An actuator is co-operable with the steering member for linear actuation of the steering member, the actuator being configured for receiving and executing commands from a controller that sends, in dependence on a defined condition, an oscillation command to the actuator to impart an oscillating force to the steering member. A method of providing feedback through a steering system of a vehicle is also disclosed, as are suitable controllers, software and processors.

24 Claims, 3 Drawing Sheets

OSCILLATORY FEEDBACK THROUGH VEHICLE STEERING

TECHNICAL FIELD

This invention relates to oscillatory feedback provided through vehicle steering. In particular, though not exclusively, this invention relates to vehicle steering systems offering oscillatory feedback to drivers. Aspects of the invention also relate to vehicles comprising such systems, methods of providing feedback through vehicle steering systems, and to suitable controllers, software and processors.

BACKGROUND

Various means are known in the art for providing feedback to drivers of motor vehicles about the state of the vehicle or its surroundings. For example, feedback may be used to warn drivers about a state or event.

Visual and audible indicator means are most common for providing feedback to drivers. However, particularly in the context of warnings, haptic feedback has also been found to be effective and desirable. For example, it is known to provide lane departure warnings to drivers via haptic feedback.

Haptic feedback may, for example, be delivered via a vehicle's steering wheel. In particular, the steering wheel may be caused to vibrate to provide a warning to be sensed by the driver's hands. It is known to provide vibrations with dedicated vibration means, such as an electric motor and imbalance, within the steering wheel or within the steering column. However such dedicated means increase complexity, weight and cost, particularly when mounted within the steering wheel where electric routing poses additional difficulty.

DE 10 2011 056 042 A1 exemplifies a haptic feedback system which makes use of a steering column adjustment motor for providing haptic feedback to the steering wheel. DE 10 2011 056 042 A1 also suggests that a steering assistance servo could be used to impart vibration to the steering column. However, the haptic feedback exemplified in this document tends to feel artificial and distinct from the feedback received via the wheels of the vehicle when driving over a rumble strip. Rumble strips are safety formations on roads designed to alert inattentive drivers to potential danger by causing a tactile vibration and audible rumbling, transmitted through the wheels into the car body. A rumble strip is usually either applied to a road in the direction of travel along an edge- or centerline, to alert drivers when they drift from their lane, or in a series across the direction of travel, to warn drivers of a stop ahead or nearby danger spot.

SUMMARY

At least some embodiments of the invention provide a steering system for a motor vehicle wherein an oscillating force can be imparted by an actuator to a linearly movable steering member and a rotatable steering column that is co-operable with the steering member.

According to an embodiment there is provided a steering system for a road vehicle, the system comprising: a rotatable steering column co-operable with a driver steering input (e.g. a steering wheel); a steering member co-operable with the steering column such that rotary motion of the steering column causes linear motion of the steering member and linear motion of the steering member causes rotary motion of the steering column; an electronic controller; and an actuator co-operable with the steering member for linear actuation of the steering member, the actuator being configured for receiving and executing commands from the electronic controller; and wherein said electronic controller is configured to send, in dependence on a defined condition, an oscillation command to the actuator to impart an oscillating force to the steering member.

The system may enable an oscillating force to be applied to the steering member. As the rotatable steering column is co-operable with the steering member, oscillation of the steering member leads to oscillation of the steering column, particularly rotary oscillation. In this manner the system may provide an effective haptic and/or audible feedback in dependence on the defined condition. In particular, since oscillating force is applied relatively distally. i.e. to the steering member rather than directly to the steering column, an advantageously realistic haptic feedback may be achieved in embodiments, for example closely simulating feedback received via the wheels of the vehicle when driving over a rumble strip.

By applying the oscillating force to a steering member, the system may, in embodiments, also provide for wider oscillatory, i.e. haptic, feedback through a vehicle structure. For example, the steering member may be mounted in a vehicle such that the oscillating force can be perceived not only through the steering column and driver input, but also through one or more other vehicle surfaces. This provides the advantage that feedback may still be noticeable even if a driver is not touching the driver input.

In an embodiment, the steering member is an elongate bar of a steering linkage or mechanism. In an embodiment, the steering member may be coupled in use to one or more steerable wheels of a vehicle, for example via a tie rod arrangement, such that linear movement of the steering member causes steering of the one or more steerable wheels. Conveniently, a steerable wheel may be coupled to each end of an elongate steering member. The steering member may thus be disposed generally transversely between first and second wheels of a vehicle in use. In an embodiment, the steering member is coupled in use to one or more steerable wheels of a vehicle such that the oscillating force is transferred to a structure of the vehicle, e.g. via a suspension of the vehicle.

The steering member may be co-operable with the steering column via a mechanical coupling and/or an electrical coupling. In an embodiment, the steering member is mechanically coupled to the steering column. Any suitable coupling for converting rotary motion to linear motion and vice versa may be employed. In an embodiment, for particularly clear feedback, the steering member advantageously includes a rack (or rack bar) and the steering column includes a pinion for engaging the rack. Advantageously, the rack may, in an embodiment, be configured for variable ratio steering.

Alternative mechanical couplings may include, for example and without limitation, recirculating ball couplings as are known in the art.

The actuator co-operable with the steering member may be of any suitable type for imparting an oscillating force to the steering member, advantageously resulting in an oscillating linear force in the steering member. The actuator may, for example, comprise an electric motor. Electrical actuators facilitate the generation of oscillating force, particularly where high frequencies are desired. Additionally or alternatively, the actuator may comprise a hydraulic actuation system.

To avoid the need for a dedicated component, the actuator may advantageously be configured to have shared functionality. Such shared functionality may advantageously avoid additional cost, weight and mounting time for oscillatory feedback functionality. In some embodiments, shared functionality may even permit retro-fitting of oscillatory feedback functionality without any need for hardware changes.

In an embodiment, the actuator comprises a steering assistance actuator for applying steering torque to the steering member to facilitate linear movement of the steering member. Thus the actuator may have the shared functionality of steering assistance. The steering assistance actuator may suitably be hydraulic or electrical. A hydraulic steering assistance system may, for example, comprise a piston coupled to the steering member, and a cylinder arrangement configured for bidirectional lateral movement of the piston and coupled steering member.

In an embodiment, the actuator comprises an electric steering assistance motor. Electric Power Assisted Steering (EPAS or EPS) systems employ an electric motor to assist drivers in providing torque required to control the direction of the steered wheels of a vehicle for controlling the direction of the vehicle. Sensors are used to detect the motion and torque input by the driver. A steering controller calculates an amount of assistive torque to apply and instructs the electric motor, for example via a CAN bus or similar vehicle based network protocol, to apply that assistive torque. The assistive torque may be applied to the steering member. Therefore, in an embodiment, an electric steering assistance motor co-operable with the steering member may act as the actuator in the system. Advantageously, in an embodiment, the actuator may be configured for simultaneously applying assistive torque and imparting an oscillating force to the steering member. Further, the actuator may be configured to impart the oscillation by the alternation of the direction of the electric steering assistance motor, the changing of the speed of the electric steering assistance motor, or both.

The actuator may be coupled to the steering member in any suitable manner for imparting oscillating force thereto, and, in an embodiment, advantageously imparting oscillating linear force thereto. In an embodiment, the actuator is an electric motor, for example an electric steering assistance motor, coupled to the steering member via a coupling that translates rotary movement of a rotor of the motor to linear force upon the steering member. An example of a suitable coupling is a ball screw. In an embodiment, the steering member comprises a screw thread and a nut, e.g. a ball assembly, driven by the motor and engaging the screw thread, the nut being fixed in position relative to the longitudinal axis of the screw thread, and whereby the motor is able to impart linear force and movement to the steering member by rotating the nut about the axis of the screw thread. In an embodiment, the nut is driven by the motor via a toothed belt. Suitably, a rotor of the motor may comprise a pinion for engaging the toothed belt. In an alternative embodiment, the nut may be driven directly by a rotor of the motor.

In an embodiment, the electric motor is coupled to the steering member in a parallel-axis arrangement or a concentric arrangement. In particular, the steering member may be linearly movable along a first axis, and the electric motor may comprise a rotor rotatable about a second axis, the first and second axes being generally parallel or concentric. For purposes of this disclosure, "generally parallel" and "generally concentric" are intended to include instances wherein the first and second axes are exactly parallel or concentric, respectively, and those instances wherein the axes are not exactly parallel or concentric, but are nonetheless suitably arranged such that the rack bar 12 and electric motor 18 operate as intended (e.g. within an acceptable tolerance of the components).

The oscillation may be imparted by the actuator in any suitable manner. As described above, where the actuator is an electric motor, the oscillation may, for example, be imparted by alternation of the direction and/or changing of the speed of the motor, which may be suitably rapid. Advantageously, the oscillation may be imparted in an embodiment such that there is no net movement of the steering member as a result of the oscillation. In other words, the steering member may return to its original position after the oscillation, subject to any other movement of the steering member, e.g. due to driver steering input and/or steering assistance.

In an embodiment, the actuator is controlled by a controller, which sends suitable commands to the actuator. Any controller, controllers, or electronic control units described herein may suitably comprise a control unit or computational device having one or more electronic processors 24 (e.g., a microprocessor, a microcontroller, an application specific integrated circuit (ASIC), etc.), each of which is configured to execute instructions for software, firmware, programs, algorithms, scripts, applications, etc. that are stored in or on, for example, an electronic memory device that is part thereof or accessible thereby, and may govern all or part of the methodologies described herein. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or electronic control unit, a suitable set of instructions may be provided which, when executed, cause said control unit or computational device to implement the control techniques specified herein. The set of instructions may suitably be embedded in said one or more electronic processors. Alternatively, the set of instructions may be provided as software to be executed on said computational device. A first controller may be implemented in software run on one or more processors. One or more other controllers may be implemented in software run on one or more processors, optionally the same one or more processors as the first controller. Other suitable arrangements may also be used.

In an embodiment, the controller is configured for sending, in dependence on a defined condition, an oscillation command to the actuator to impart oscillating force to the steering member. In particular, the controller is configured for sending the oscillation command when a defined condition, or at least one of a plurality of defined conditions, is met. The command may be sent over an addressable bus system, for example by using a CAN network protocol or any other suitable protocol.

Defined conditions in which the oscillating force is to be imparted to the steering member to provide oscillatory feedback may be set as desired. The defined condition may, for example, be a state of a vehicle in which the steering system is fitted, or a state of said vehicle's surroundings. In an embodiment, the electronic controller is configured to receive information from one or more sensors that sense information related to the defined condition, the information comprising at least one of a steering angle imparted to the steering column, a rate of change of steering angle imparted to the steering column, a steering torque imparted to the steering column, a vehicle speed, a suspension articulation, or a proximity sensor output. In an embodiment, the defined condition may be a warning state. In an embodiment, the defined condition comprises one or more of: a lane departure warning state, a vehicle speed warning state, or a forward alert warning state (i.e. a warning using forward sensing technology (radar, lidar, camera etc.) coupled to a processor that alerts the driver if the distance or time separation to a vehicle in front falls below a determined value).

The controller may be configured for receiving information related to the defined condition. Said information may be received, for example, from other vehicle systems or controllers. In an embodiment, the system comprises one or more sensors for sensing information related to the defined condition and providing said information to the controller. In an embodiment, the information related to the defined condition may comprise one or more of: steering angle imparted to the steering column, rate of change of steering angle imparted to the steering column, and steering torque imparted to the steering column. Further non-limiting examples of information related to the defined condition may include vehicle speed, suspension articulation, and proximity sensor output.

The controller may be configured with a suitable routine for determining from received information related to the defined condition whether the defined condition is met, and sending the oscillation command if the condition is met. Determining when the defined conditions are met may comprise comparing the received information to defined conditions stored in a memory, for example in the form of a look up table.

In an embodiment, the oscillation command may advantageously comprise instructions related to one or more properties of the oscillation to be imparted by the actuator. Such properties may comprise, without limitation, at least one of: timing, frequency, or amplitude of the oscillation.

The properties of the oscillation may be consistent with providing desired haptic and/or audible feedback, e.g. structure borne noise, via the steering column to the driver input. In an embodiment, the oscillation has a duration in the range of from 0.5 to 3 seconds, for example in the range of from 1 to 2 seconds. In an embodiment, the oscillation has a frequency in the range of from 15 to 35 Hz, for example in the range of from 25 to 27 Hz. In an embodiment, the oscillation provides a handled torque in the range of from 0.5 to 5 Nm, for example in the range of from 1 to 3 Nm in the steering column. In an embodiment, the maximum displacement of the steering member by the oscillation is in the range of from 0 to 0.5 mm, for example in the range of from 0 to 0.1 mm, and, in an embodiment, about 0.1 mm.

The system may be configured to offer a range of oscillatory feedback. In an embodiment, the controller is configured for selecting the oscillation command from a plurality of oscillation commands. The selected oscillation command may be associated with a particular defined condition, and selected by the controller in dependence on said particular defined condition. Conveniently, a list of oscillation commands may be stored and mapped against associated defined conditions in a look-up table accessible by the controller. Advantageously, each one of the plurality of oscillation commands may comprise instructions related to one or more properties of its associated oscillation. To enable distinct haptic feedback in dependence on distinct conditions, the plurality of oscillation commands may advantageously comprise at least first and second oscillation commands with differing instructions related to one or more properties of their oscillations.

In an embodiment, the controller is configured for omitting to send the oscillation command in dependence on one or more override factors. The controller may be configured for receiving information related to one or more override factors. One or more override factors may, for example, be taken into account in defining the defined condition, or may be taken into account by the controller as an override of the oscillation command once a defined condition is met.

A non-limiting example of an override factor may be sharp turning of the steering system. In an embodiment, the controller is configured to omit sending the oscillation command to the actuator if the controller determines a sharp turn state. A sharp turn state may be determined, for example, if the rate of change of steering and/or steering torque in the steering column exceeds a set threshold. A sharp turn state may be determined by the controller from information received from one or snore sensors of the steering system, and/or from other vehicle systems.

To avoid the need for a dedicated component, the controller may advantageously be configured to have shared functionality. Such shared functionality may advantageously avoid additional cost, weight and mounting time for haptic feedback functionality. In some embodiments, shared functionality may even permit retro-fitting of haptic feedback functionality without any need for hardware changes. In an embodiment, the controller is an assisted steering controller and/or a shared electronic control unit of the vehicle.

Advantageously, in an embodiment, the controller may be configured for determining a combined actuation command based on the oscillation command and a desired steering assist torque. The controller may advantageously be configured for sending the combined actuation command (comprising the oscillation command and a steering assist torque command) to the actuator for simultaneously applying assistive torque and imparting an oscillating force to the steering member, for example by a single actuator.

As aforesaid, the steering system may be installed in a road vehicle in use. Accordingly, in an embodiment, a steering system installed in a road vehicle is provided. Suitably, the system may comprise: a rotatable steering column coupled with a driver steering input, e.g. a steering wheel; a steering member coupled with the steering column such that rotary motion of the steering column causes linear motion of the steering member and linear motion of the steering member causes rotary motion of the steering column; a controller; and an actuator coupled with the steering member for linear actuation of the steering member, the actuator being configured for receiving and executing commands from the controller; and wherein said controller is configured to send, in dependence on a defined condition, an oscillation command to the actuator to impart an oscillating force to the steering member. Other, optional features of the steering system may be, for example, as hereinabove described.

According to another embodiment, a road vehicle comprising a powertrain, a body, a plurality of wheels and a steering system as described or defined anywhere herein is provided. In an embodiment, the vehicle comprises first and second steerable wheels steered by the steering system. In an embodiment, the vehicle is a motor vehicle, in particular a motor car. Conveniently, the steering member of the steering system may take the form of a bar coupled at each end to one of said steerable wheels, for example via tie rod arrangements, such that linear movement of the steering member causes steering of the steerable wheel(s). In an embodiment, the steering member of the steering system may be mounted in the vehicle such that the oscillating force can be perceived through both the steering column and driver input, and through one or more other vehicle surfaces. Other, optional features of the steering system may be, for example, as hereinabove described.

According to yet another embodiment, a method of providing oscillatory feedback through a steering system of a road vehicle is provided, the method comprising imparting an oscillating force to a linearly movable steering member of the steering system, the steering member being coupled to a driver steering input (e.g. steering wheel) via a rotatable steering column of the steering system. Optionally, the steering member, steering column, oscillating force and other parts of the steering system may be, independently, as hereinabove described.

Advantageously, the feedback may be haptic and/or audible feedback. In an embodiment, the method may generate said oscillating force by oscillating an electric motor.

In an embodiment, the method comprises providing said feedback selectively in dependence on a defined condition, e.g. as hereinabove described.

The method may further comprise providing steering assistance. In an embodiment, the method comprises simultaneously app assistive steering torque and imparting an oscillating force to the steering member.

The method may be computer implemented. Accordingly, in another embodiment, a carrier medium carrying computer readable code for controlling a vehicle or vehicle steering system to carry out the method is provided. In yet another embodiment, a computer program executable on a processor so as to implement the method is provided. In yet still another embodiment, a non-transitory, computer readable medium loaded with such a computer program is provided. In a further embodiment, a processor arranged to implement the method or the computer program is provided.

Embodiments of the invention may be as described in connection with any of the other embodiments. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, wherein like designations denote like elements, and wherein.

DETAILED DESCRIPTION OF THE ILLUSTRATED EMBODIMENT(S)

Figure 1:
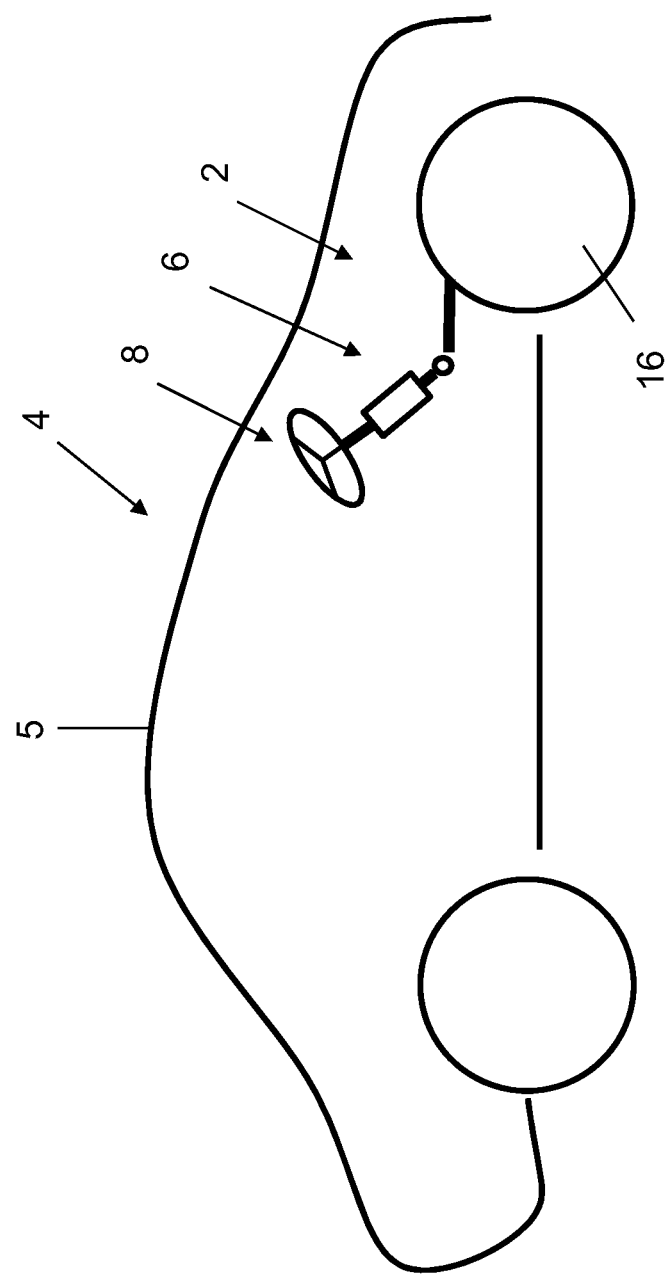
FIG. 1 is a schematic side view of a vehicle comprising an illustrative embodiment of a vehicle steering system.
Figure 2:
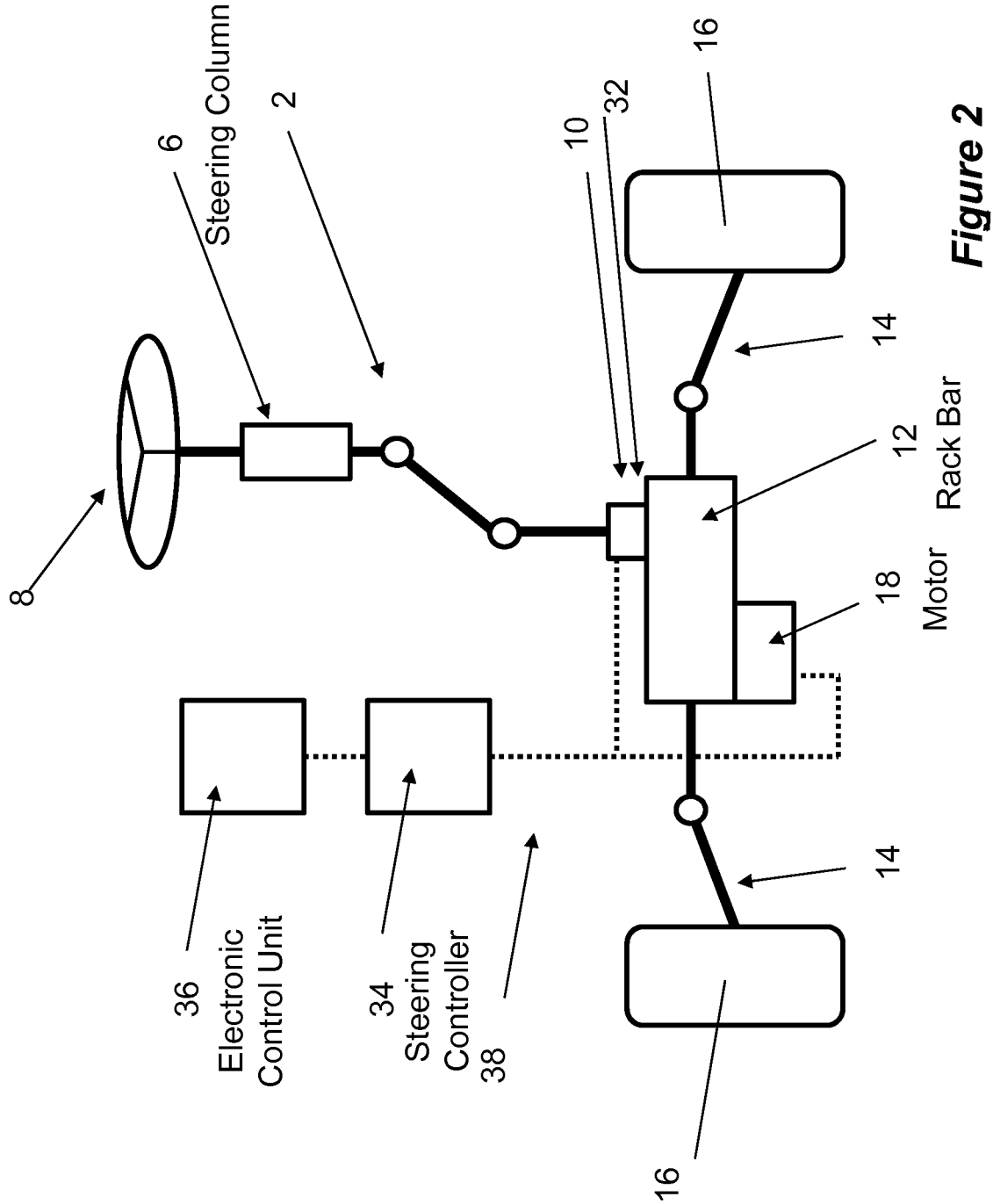
FIG. 2 is a schematic view of the vehicle steering system illustrated in FIG. 1.

With reference to FIGS. 1 and 2, in one embodiment there is provided a steering system 2 in a motor vehicle in the form of, for example, a motor car 4. The system comprises a rotatable steering column 6 coupled at a proximal end to a driver steering input in the form of a steering wheel 8. At an opposed, distal end, the steering column 6 comprises a pinion 10.

In the view of FIG. 1 the distal end of the steering column 6 and distal components of the system 2 linked thereto are not shown in the interest of clarity. Referring now therefore specifically to the illustrative embodiment illustrated in FIG. 2, a steering member in the form of a rack bar 12 is co-operable and mechanically coupled with the steering column 6, in particular the pinion 10 thereof, such that rotary motion of the steering column 6 causes linear motion of the rack bar 12 and linear motion of the rack bar 12 causes rotary motion of the steering column 6. Furthermore, in the illustrated embodiment, the rack bar 12 is coupled via first and second tie rod assemblies 14 to first and second wheels 16, such that linear motion of the rack bar 12 causes the first and second wheels 16 to be steered. The wheels 16 may thus be steered by rotation of the steering wheel 8, which leads to rotation of the steering column 6, which in turn causes linear movement of the rack bar 12 and steering of the wheels 16.

In an embodiment, steering of the wheels 16 is assisted by an actuator in the form of an electric steering assistance motor 18 coupled to the rack bar 12. In such an embodiment, the system is thus an Electric Power Assisted Steering (SPAS or EPS) system.

Figure 3:
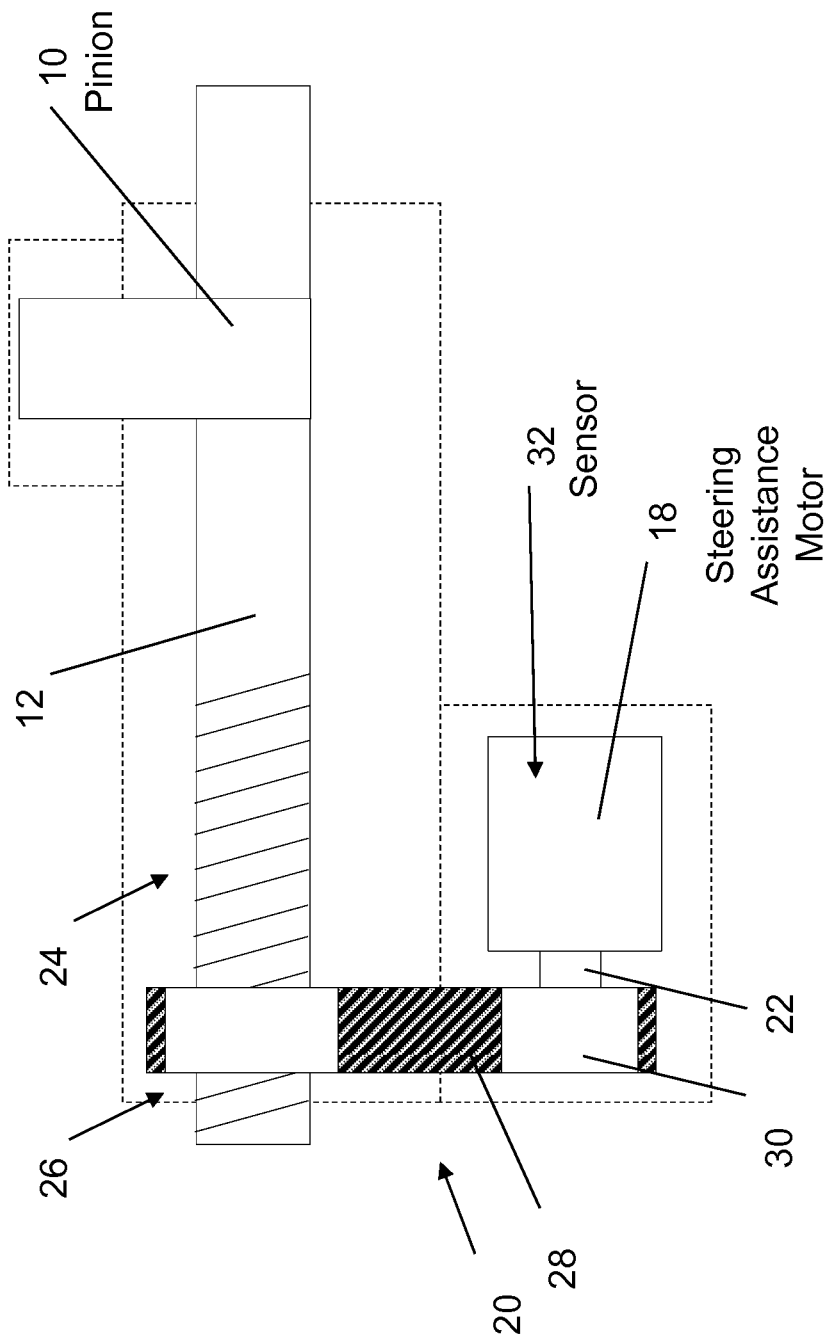
FIG. 3 is a schematic view of an illustrative embodiment of a motor and rack and pinion coupling of the steering system illustrated in FIG. 2.

Referring now additionally to FIG. 3, in an embodiment, the steering assistance motor 18 is coupled to the rack bar 12 in a parallel-axis arrangement. In particular, the rack bar 12 is linearly movable along a first axis, and the electric motor 18 comprises a rotor rotatable about a second axis, the first and second axes being generally parallel.

Referring particularly to the embodiment depicted in FIG. 3, the steering assistance motor 18 is coupled to the rack bar 12 via a coupling 20 that translates rotary movement of a rotor 22 of the motor 18 into linear force upon the rack bar 12. In the illustrated embodiment, the rack bar 12 comprises a screw thread 24, and a fixedly positioned ball assembly 26, driven by the motor 18, engages the screw thread 24, thereby acting as a nut. The motor 18 is therefore able to impart linear force and movement to the rack bar 12 by rotating the ball assembly 26. In an embodiment, the ball assembly 26 is driven by the motor 18 via a toothed belt 28, and the rotor 22 of the motor 18 comprises a pinion 30 for engaging the toothed belt 28.

Referring again to FIG. 1, the steering assistance motor 18 assists in providing torque required to control the direction of the steered wheels 16. Sensors 32 in the region of the pinion 10 may be used to monitor, sense, detect, measure, or otherwise determine any torque input through the steering wheel 8. Furthermore, motion of the rack bar 12 is detected by a rotor position sensor 32 within the motor 18. A steering controller 34, comprising a control unit or computational device having one or more electronic processors, receives information from the sensors 32 and calculates an amount of assistive torque to apply and commands the motor 18 to apply that assistive torque via, for example, a CAN bus, or using another suitable communication technique.

It will be appreciated that sensors 32 may comprise any number of different sensors, components, devices, modules, systems, etc., configured to monitor, sense, detect, measure, or otherwise determine a variety of parameters. For example, in addition to those described above (i.e. steering wheel torque sensor and rotor position sensor of the motor 18), sensors 32 may comprise: steering angle sensor(s) for monitoring, sensing, detecting, measuring, or otherwise determining a steering angle imparted to steering column 6 or a rate of change of the steering angle imparted to steering column 6); steering column torque sensor(s) for monitoring, sensing, detecting, measuring, or otherwise determining steering torque imparted to steering column 6; vehicle speed sensor(s) for monitoring, sensing, detecting, measuring, or otherwise determining the speed of the motor car 4; suspension articulation sensor(s) for monitoring, sensing, detecting, measuring, or otherwise determining suspension articulation; and/or proximity sensor(s) for monitoring, sensing, detecting, measuring, or otherwise determining proximity of the motor car 4 to another one or more of a moving or stationary object, and which may include, for example, forward or rearward looking radar or lidar sensors, ultrasonic sensors or the like. In any event, sensors 32 may provide information that can be used by the methodology described herein, and may be embodied in hardware, software, firmware, or some combination thereof. Sensors 32 may directly sense or measure the conditions or parameters for which they are provided, or they may indirectly evaluate such conditions/parameters based on information provided by other sensors, components, devices, modules, systems, etc. Further these sensors may be directly coupled to controller 34, indirectly coupled thereto via other electronic devices, vehicle communications bus, network, etc., or coupled in accordance with some other arrangement known in the art.

The motor 18 may also be configured for receiving and executing other commands from the controller 34 for providing haptic and/or audible feedback via the steering system 2. In an embodiment, the controller 34 is configured for sending, in dependence on a defined condition, an oscillation command to the motor 18 to impart an oscillating force to the rack bar 12. In such an embodiment, the motor 18 and controller 34 are thus each configured for shared functionality. As part of this shared functionality, the steering assistance motor 18 may be commanded by the controller 34, via, for example, the CAN bus, to simultaneously apply assistive torque and impart an oscillating force to the rack bar 12. In particular, the controller 34 may be configured for determining a combined actuation command based on the oscillation command and a desired steering assist torque, and for sending a combined actuation command (comprising the oscillation command and a steering assist torque command) to the motor 18 for simultaneously applying assistive torque and imparting an oscillating force to the rack bar 12.

The oscillation may be imparted by alternation of the direction and/or changing, in particular a pulsed change to, the speed of the motor 18. In an embodiment, there is no net movement of the rack bar 12 as a result of the oscillation command applied to the rack bar 12.

In an embodiment, though certainly not the only embodiment, the defined condition is a lane departure warning state. The lane departure warning state may be determined by the controller 34 from related information received from, for example, an electronic control unit 36 of the vehicle. Alternatively, the lane departure state could be determined by the controller 34 based additionally on information received from one or more sensors 32. The sensors 32 may be arranged in any suitable manner. An example of a lane departure sensor arrangement is described in WO2008091565 A1, the entire contents of which are incorporated herein by reference.

In an embodiment, the controller 34 is configured with a routine for determining regularly, e.g. once per second, half second, etc., whether the defined condition is met, i.e. whether a lane departure warning state exists, and for sending an oscillation command to the motor 18 if the condition is met. If appropriate, the controller 34 may be further configured to distinguish between distinct variants of lane departure warning states.

The oscillation command sent by the controller 34 includes instructions related to the properties of the oscillation Co be imparted by the motor 18, including, for example, one or more of timing, frequency and amplitude of the oscillation. The properties of the oscillation are consistent with providing desired haptic and audible feedback, in particular structure borne noise or vibration. In one example, though certainly not the only one, an oscillation has a duration of 1.6 seconds and a frequency of 26 Hz, providing a handled torque of about 2 Nm in the steering column. In an embodiment, the maximum displacement of the steering member by the oscillation is about 0.09 mm, though it will be appreciated that the present disclosure is not limited to such a maximum displacement.

In an embodiment, the controller 34 is configured for selecting the sent oscillation command from a plurality of oscillation commands. In this way the system 2 is configured to offer a range of haptic feedback. A list of oscillation commands is stored and mapped against, for example, associated lane departure warnings (or types of warnings other than lane departure warnings, as the case may be) in a look-up table accessible by or within the controller 34. Each one of the plurality of oscillation commands comprises instructions related to the properties of its associated oscillation. To enable distinct haptic feedback in dependence on distinct conditions, e.g. lane departure warnings, the plurality of oscillation commands comprises a plurality of oscillation commands with differing instructions related to one or more properties of their oscillations.

The controller 34 may also configured to omit sending the oscillation command in dependence on an override factor, for example, a sharp turn state. In particular, in an embodiment the controller 34 does not send oscillation commands when a sharp turn state is determined from information received from the electronic control unit 36 or the steering system sensors 32.

In an embodiment wherein the rotatable steering column 6 is co-operable with the rack bar 12, oscillation of the rack bar 12 leads to oscillation of the steering column 6, particularly rotary oscillation. In this manner the system 2 provides for effective haptic feedback. In particular, since oscillating force is applied relatively distally, i.e. to the rack bar 12 rather than directly to the steering column 6 or the steering wheel 8, an advantageously realistic haptic feedback is achieved, closely simulating feedback received via the wheels 16 of the vehicle when driving over, for example, a rumble strip.

In an embodiment, the system 2 also provides for wider haptic feedback through the vehicle structure. In particular, the rack bar 12 may be mounted such that the oscillating force can be perceived not only through the steering column 6 and steering wheel 8, but also through other vehicle surfaces or structures 38. In an embodiment, the rack bar 12 is coupled to the steerable wheels 16 of the vehicle such that the oscillating force is transferred to the structure 38 of the vehicle via the steering and/or suspension of the vehicle (not shown). This provides the advantage that haptic feedback may still be noticeable even if a driver is not touching the steering wheel 8.

The system 2 thus illustrates and is configured to perform or carry out a method of providing feedback through a steering system by imparting an oscillating force to a linearly movable steering member of the steering system, to which a driver steering input is coupled via a rotatable steering column of the steering system.

It will be appreciated that many modifications can be made to the system 2 without departing from the scope of the invention as defined in, for example, the appended claims. For example, the controller 34 could be configured to command haptic feedback in additional or alternative defined conditions. A dedicated actuator could be employed for imparting oscillation to the steering member instead of the steering assist motor 18, and/or a hydraulic actuator may be used instead of an electric actuator.

For economy, the controller 34 performing the described haptic feedback functions in this embodiment also functions as a steering assistance controller. The controller 34 could be further programmed to perform other known control functions within the vehicle, e.g. those of the electronic control unit 36. It will be appreciated that the electronic control unit 36, which may also be referred to as a vehicle control unit (VCU) may, in addition to some or all of the functions described above, carry out one or more other control functions of the vehicle as known in the art. Alternatively, a dedicated controller, not performing any other functions at all, could be used for the haptic feedback system. The controller may thus be implemented as a shared controller of the vehicle or as a dedicated controller.

As aforesaid, the controller 34 in the above-described embodiment comprises a control unit or computational device having one or more electronic processors (e.g., a microprocessor, a microcontroller, an application specific integrated circuit (ASIC), etc.). The controller 34 may comprise a single control unit or electronic controller or alternatively different functions of the controller may be embodied in, or hosted in, different control units or controllers. In any event, the electronic processor(s) of the control unit(s) of controller 34 may each be configured to execute instructions for software, firmware, programs, algorithms, scripts, applications, etc. that are stored in or on, for example, an electronic memory device that is part thereof or accessible thereby, and may govern all or part of the methodologies described herein. The controller 34 may also be electronically connected to other components of system 2 or motor car 4 via suitable communications (e.g. CAN bus, system management bus (SMBus), a proprietary communication link, or through some other arrangement known in the art) and can interact with them when or as required.

In an embodiment, a set of instructions may be provided to carry out, perform, or implement the methodology described herein. These instructions may comprise a computer program containing computer-readable code that when executed by one or more suitable or appropriately configured electronic processors or controllers causes the methodology described herein to be performed. The instructions (e.g., computer program or code) may be embedded in a computer-readable medium (e.g. a non-transitory or non-transient storage medium) or may be carried by a carrier medium. The computer-readable medium may comprise, for example, any mechanism for storing information in a form readable by a machine or electronic processors/computational device, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above.

Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims. Additionally, features, characteristics, or aspects described in conjunction with one embodiment are to be understood to be applicable to any other embodiment described herein unless incompatible therewith.

As used in this specification and claims, the terms "for example," "e.g., or instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "comprise" and "contain" and variations thereof, for example "comprising" and "comprises", mean "including but not limited to", and are not intended to (and do not) exclude other possibilities not expressly provided for herein. Moreover the singular encompasses the plural unless the context otherwise requires: in particular, where the indefinite article is used, the specification is to be understood as contemplating plurality as well as singularity, unless the context requires otherwise. Other terms are to be construed using their broadest reasonable meaning unless they are used in a context that requires a different interpretation.

The invention claimed is:

1. A steering system for a road vehicle, the system comprising:
   a rotatable steering column co-operable with a driver steering input;
   a steering member co-operable with the steering column such that rotary motion of the steering column causes linear motion of the steering member and linear motion of the steering member causes rotary motion of the steering column;
   an electronic controller; and
   an actuator co-operable with the steering member for linear actuation of the steering member, the actuator being configured for receiving and executing commands from the electronic controller; and wherein
   said electronic controller is configured to send, in dependence on a defined condition, an oscillation command to the actuator to impart an oscillating force to the steering member.

2. The system of claim 1, wherein the steering member is an elongate bar of a steering mechanism and is coupled to one or more steerable wheels of a vehicle such that linear movement of the steering member causes steering of said one or more steerable wheels.

3. The system of claim 1, wherein the steering member includes a rack and the steering column includes a pinion for engaging said rack.

4. The system of any claim 1, wherein the actuator comprises an electric steering assistance motor for applying steering torque to the steering member to facilitate linear movement to the steering member, and wherein the actuator is configured for simultaneously applying assistive torque and imparting an oscillating force to the steering member, and further wherein the actuator is configured to impart the oscillation by the alternation of the direction of the electric steering assistance motor, the changing of the speed of the electric steering assistance motor, or both.

5. The system of claim 1, wherein the actuator is an electric motor coupled to the steering member via a coupling that translates rotary movement of a rotor of the motor to linear force upon the steering member, and wherein the steering member comprises a screw thread and a nut engaging the screw thread and driven by the motor, said nut fixed in position relative to the longitudinal axis of the screw thread, whereby the motor is able to impart linear force and movement to the steering member by rotating the nut about the axis of the screw thread.

6. The system of claim 1, wherein the actuator is an electric motor coupled to the steering member via a coupling that translates rotary movement of a rotor of the motor to linear force upon the steering member, and further wherein the electric motor is coupled to the steering member in one of a parallel-axis and a concentric arrangement and in which the steering member is linearly movable along a first axis, and the electric motor comprises a rotor rotatable about a second axis, the first and second axes being generally parallel or concentric.

7. The system of claim 1, wherein the defined condition is a state of a vehicle or a state of a vehicle's surroundings, and wherein the electronic controller is configured to receive information from one or more sensors that sense information related to the defined condition, said information comprising at least one of: a steering angle imparted to the steering column, a rate of change of steering angle imparted to the steering column, a steering torque imparted to the steering column, a vehicle speed, a suspension articulation, or a proximity sensor output.

8. The system of claim 1, wherein the defined condition comprises at least one of: a lane departure warning state, a vehicle speed warning state, or a forward alert warning state.

9. The system of any claim 1, wherein the oscillation command comprises instructions related to one or more properties of the oscillation to be imparted by the actuator, and wherein said one or more properties comprise at least one of: timing, frequency, or amplitude of the oscillation.

10. The system of claim 1, wherein the controller is configured for selecting the oscillation command from a plurality of oscillation commands and wherein a list of oscillation commands is stored and mapped against associated defined conditions in a look-up table accessible by the controller, said plurality of oscillation commands comprising at least first and second oscillation commands with differing instructions related to one or more properties of their oscillations.

11. The system of claim 1, wherein the controller is configured for omitting to send the oscillation command in dependence on one or more override factors.

12. A steering system installed in a road vehicle, the system comprising:

a rotatable steering column coupled with a driver steering input;

a steering member coupled with the steering column such that rotary motion of the steering column causes linear motion of the steering member and linear motion of the steering member causes rotary motion of the steering column;

an actuator coupled with the steering member for linear actuation of the steering member, the actuator being configured for receiving and executing commands from a controller; and a controller configured for sending, in dependence on a defined condition, an oscillation command to the actuator to impart an oscillating force to the steering member.

13. A road vehicle comprising a plurality of wheels, and a steering system according to claim 12.

14. The vehicle according to claim 13, wherein the steering member of the steering system is mounted in the vehicle such that the oscillating force can be perceived through both the steering column and driver input, and through one or more other vehicle surfaces.

15. A method of providing oscillatory feedback through a steering system of a road vehicle, the method comprising imparting an oscillating force to a linearly movable steering member of the steering system, the steering member being coupled to a driver steering input via a rotatable steering column of the steering system.

16. The method of claim 15 wherein the feedback is haptic and/or audible feedback.

17. The method of claim 15 comprising generating said oscillating force by oscillating an electric motor.

18. The method of claim 15 comprising providing said feedback selectively in dependence on a defined condition.

19. The method of claim 15 comprising determining the oscillating force in dependence on information related to a defined condition and/or an override factor.

20. The method of claim 19 comprising sensing said information.

21. The method of claim 15 comprising simultaneously applying assistive steering torque and imparting an oscillating force to the steering member.

22. A non-transitory carrier medium carrying computer readable code for controlling a vehicle or vehicle steering system to carry out the method of claim 15.

23. A non-transitory computer readable medium loaded with a computer program executable on a processor so as to implement the method of claim 15.

24. A processor arranged to implement the method of any claim 15.

* * * * *